United States Patent [19]

Kamada et al.

[11] 4,199,421
[45] Apr. 22, 1980

[54] COATING COMPOSITION AND A METHOD FOR PRODUCING A SYNTHETIC RESIN MOLDED PRODUCT HAVING AN ABRASION RESISTANT SURFACE

[75] Inventors: Kazumasa Kamada; Kenji Kushi, both of Ohtake; Keisuke Yoshihara, Yokohama; Hideo Nakamoto, Nagoya, all of Japan

[73] Assignee: Mitsubishi Rayon Company, Limited, Tokyo, Japan

[21] Appl. No.: 878,830

[22] Filed: Feb. 17, 1978

[30] Foreign Application Priority Data

Feb. 23, 1977 [JP] Japan ................................ 52/19038

[51] Int. Cl.² .......................... C08F 2/46; C08F 8/00; B05D 3/06
[52] U.S. Cl. .......................... 204/159.22; 204/159.16; 204/159.23; 204/159.24; 264/1; 264/22; 351/166; 427/44; 427/164; 427/420; 427/421; 427/429; 428/412; 428/442; 428/500; 526/270; 526/320; 427/54.1; 427/389.7; 427/393.5
[58] Field of Search .................... 204/159.22, 159.23, 204/159.16; 427/44, 54, 385 B, 385 A; 264/1, 22; 526/270, 320; 351/166

[56] References Cited

U.S. PATENT DOCUMENTS

| 3,551,311 | 12/1970 | Nass et al. ........................ 204/159.18 |
| 3,840,448 | 10/1974 | Osborn et al. ................... 204/159.14 |
| 3,915,824 | 10/1975 | McGinniss ...................... 204/159.23 |
| 3,968,305 | 7/1976 | Oshima et al. ...................... 427/54 X |
| 3,992,276 | 11/1976 | Powanda et al. ............... 204/159.16 |
| 4,012,559 | 3/1977 | Fujioka et al. .............. 204/159.16 X |
| 4,039,772 | 8/1977 | Dickie et al. ................ 204/159.15 X |
| 4,049,634 | 9/1977 | Ko et al. ..................... 204/159.16 X |
| 4,077,858 | 3/1978 | Costanza et al. ................ 204/159.23 |

FOREIGN PATENT DOCUMENTS

| 4912886 | 10/1970 | Japan . |
| 4922951 | 12/1970 | Japan . |
| 48-42211 | 12/1973 | Japan . |
| 1198259 | 7/1970 | United Kingdom . |

Primary Examiner—Ronald H. Smith
Assistant Examiner—Thurman K. Page
Attorney, Agent, or Firm—Oblon, Fisher, Spivak, McClelland & Maier

[57] ABSTRACT

This invention relates to a coating composition which comprises a polyfunctional monomer having at least three acryloyloxy groups and/or methacryloyloxy groups in one molecule, a monomer having not more than two acryloyloxy group and/or methacryloyloxy groups in one molecule and optionally a photosensitizer and which can form a crosslink-hardened film excellent in abrasion resistance upon curing by irradiation with actinic radiation in air and a method for producing a synthetic resin molded product having an abrasion resistant surface.

8 Claims, No Drawings

COATING COMPOSITION AND A METHOD FOR PRODUCING A SYNTHETIC RESIN MOLDED PRODUCT HAVING AN ABRASION RESISTANT SURFACE

BACKGROUND OF THE INVENTION

1. Field of the Invention

This invention relates to a coating composition capable of forming hard film having excellent abrasion resistance, surface smoothness, flexibility, water resistance, heat resistance, solvent resistance, durability and adhesiveness to substrates.

2. Description of the Prior Art

Synthetic resin molded products produced from polymethyl methacrylate resin, polycarbonate resin, polyallyldiglycol carbonate resin, polystyrene resin, styrene-acrylonitrile copolymer resin (AS resin), polyvinyl chloride resin, acetate resin, acrylonitrile-butadiene-styrene copolymer resin (ABS resin), polyester resin, etc. have various advantages such as light in weight, excellent shock resistance, low cost, easy moldability, etc. as compared with glass articles and have been developed in various fields of use such as optical uses, e.g., organic plate glasses, covers for lighting fitting, optical lens, spectacle lens, light reflector, mirror and the like, decorative uses, e.g., signs, displays and the like and automotive parts, e.g., name plates, dust cover cases and the like. However, the surfaces of these synthetic resin molded products have insufficient abrasion resistance and thus the surface may be damaged by contact and collision with other articles or scratched during transportation of the molded products, installation of parts or use of the products to cause decrease in yield of the products or to damage a beautiful appearance. Especially, when the molded products are used as optical lenses such as those of cameras, magnifying glasses, etc. spectacle lenses such as fashion glasses, sun glasses, lenses for correction of eyesight, etc., window glass, decoration cases, covers, clock lenses, light reflectors, mirrors and the like. The damages to the surface causes an extreme reduction in the commercial value and renders them unusable in a short period of time. Thus, a need for improved abrasion resistance exists.

Previously, many proposals have been suggested to improve the abrasion resistance of the synthetic resin molded products. For example, there is a method which comprises coating silicone material or melamine material onto the surface of synthetic resin molded products and hardening it with heat treatment, namely, forming the so-called thermosetting type crosslink-hardened film on the surface of the synthetic resin molded products. However, since these methods are thermosetting type, not only is storage stability of the coating material unsatisfactory, but formation of crosslink-hardened film requires heating at high temperatures for a long period of time. Therefore, productivity is low and, furthermore, since the hardening reaction proceeds gradually even after the crosslinking and hardening treatment, cracks occur in the crosslink-hardened film on the products or cracks occur at the interface between the film and substrate which reduce adhesiveness to the substrate and cause inferior water resistance and weather resistance.

Another method comprises coating the surface of synthetic resin molded products with a polyfunctional acrylate or methacrylate monomer having at least 2 polymerizable ethylenically unsaturated groups in one molecule as the coating material and irradiating the coated monomer with actinic radiation to produce a crosslink-hardened film on the surface of the synthetic resin molded products by radical polymerization.

Since said polyfunctional (meth)acrylate (which means acrylate or methacrylate in this specification) monomers have excellent polymerization activity when irradiated with actinic radiation, these have been proposed as materials for quick-drying ink in U.S. Pat. Nos. 3,661,614, 3,551,311 and 3,551,246 and British Pat. No. 1,198,259. Moreover, U.S. Pat. Nos. 3,552,986, 2,413,973 and 3,770,490 propose application of these polyfunctional (meth)-acrylate monomers as surface modifiers of synthetic resin molded products.

The present applicants have also found that polyfunctional (meth)-acrylate monomers have excellent crosslink-hardening polymerizability and are effective as materials for forming crosslink-hardening film capable of improving abrasion resistance of the surface of synthetic resin molded products and they have made a number of proposals (Japanese Patent Publication Nos. 42211/63, 12886/64, 22951/64, 14859/64 and 22952/64).

As compared with the former method which comprises forming a crosslink-hardened film by heat treatment of heat-hardenable coating material, the method which comprises coating these polyfunctional (meth)acrylate monomers as a crosslink-hardenable coating material on the surface of synthetic resin molded products and irradiating with actinic radiation to form a crosslink-hardened film on the surface of the synthetic resin molded products has various merits. The storage stability of the coating material is good, the crosslink-hardened film can be produced in a short time, on the order of minute or second at room temperature because polymerization crosslink-hardening is effected by irradiation with actinic radiation and, thus, productivity is excellent, efficiency and abrasion resistance are excellent, no change of the hardened film occurs with lapse of time, water resistance, weather resistance, initial adhesiveness to the substrate are excellent, etc.

On the other hand, it is known that this method has the following problems. First, that if formation of the crosslink-hardened film by irradiation with actinic radiation after coating of the coating material on the surface of the synthetic resin molded products is not carried out in an inert gas atmosphere such as nitrogen gas, carbon dioxide gas, a crosslink-hardened film having a sufficient abrasion resistance cannot be produced because the crosslink-hardening reaction is inhibited by the oxygen in the air. This is an extremely great problem in practical use. Not only does the operation become complicated, but variability occurs in performance which reduces the yield and increases the cost because it is difficult to maintain a constant, low oxygen concentration in an atmosphere. The second is that the polyfunctional (meth)acrylate monomers generally have a high viscosity at room temperature and those which are most effective in improving the abrasion resistance, have a high viscosity which lowers their coating performance and limits the coating method of the coating material. The surface smoothness of the crosslink-hardened film is not adequate, the film thickness is not uniform, control of the film thickness is difficult and it is very difficult to form a thin crosslink-hardened film excellent in adhesiveness to the substrate, having good abrasion resistance, surface smoothness and uniformity of film thickness.

Thus, synthetic resin molded products having a crosslink-hardened film on the surface obtained by coating polyfunctional (meth)acrylate monomers as a coating material on the surface of synthetic resin molded products still have many problems and need to be improved and have not yet been put to practical use. A need continues to exist therefore, for a coating composition which improves the abrasion resistance of products prepared from synthetic resins.

BRIEF SUMMARY OF THE INVENTION

An object of the present invention is to provide a coating composition for synthetic resins which will undergo cross-linking upon irradiation with actinic radiation in an oxygen containing atmosphere.

Another object of the present invention is to provide a method for providing products molded from synthetic resins with abrasion resistant surfaces.

These and other objects of the present invention which will become apparent have been attained through a coating composition which comprises 100 parts by weight of a monomer mixture (A) comprising 30-98% by weight of at least one polyfunctional monomer selected from the groups of compounds having at least three acryloyloxy groups and/or methacryloyloxy groups in one molecule and 70-2% by weight of a monomer having not more than two acryloyloxy groups and/or methacryloyloxy groups in one molecule and 0-10 parts by weight of a photosensitizer and which can form a crosslink-hardened film excellent in abrasion resistance by irradiation with actinic radiation in air. An abrasion resistant surface can be formed on synthetic resin molded products by coating said composition on the surface of the synthetic resin molded products and irradiating with actinic radiation to form a crosslink-hardened film having a thickness of 1-30μ.

DESCRIPTION OF THE PREFERRED EMBODIMENTS

The coating composition of this invention primarily composed of the (meth)acrylate monomer mixture which is the most important component, and comprises 100 parts by weight of a monomer mixture (A) comprising 30-98% by weight of at least one polyfunctional monomer selected from the group of compounds having at least three acryloyloxy groups and/or methacryloyloxy groups in one molecule and 70-2% by weight of a monomer having not more than two acryloyloxy and/or methacryloyloxy groups in one molecule and 0-10 parts by weight of a photosensitizer. This coating composition can produce a transparent crosslink-hardened film excellent in abrasion resistance, surface smoothness, flexibility, water resistance, heat resistance, solvent resistance and adhesiveness to synthetic resin substrate even when it is irradiated with actinic radiation in an oxygen-containing atmosphere such as air.

The polyfunctional monomer having at least three acryloyloxy groups and/or methacryloyloxy groups in one molecule is essential for imparting a high abrasion resistance to the crosslink-hardened film formed by irradiation with actinic radiation and it is necessary that the proportion of said polyfunctional monomer in the monomer mixture (A) is within the range of 30-98% by weight, preferably 40-96% by weight. When the proportion is less than 30% by weight, a crosslink-hardened film having sufficient abrasion resistance cannot be obtained and when more than 98% by weight, the abrasion resistance is satisfactory, but flexibility and adhesiveness to the substrate decreases and causes undesired phenomena such as the formation of cracks and peeling of the film. These tri or more functional monomers may be used alone or in admixture of two or more other polyfunctional monomers having at least three functional groups with the range as mentioned above.

The monomers having not more than two acryloyloxy and/or methacryloyloxy groups in one molecule are necessary to increase the adhesiveness of the crosslink-hardened film to the substrate, to impart flexibility to the film and to increase its durability. Said monomers are present in an amount of 70-2% by weight, preferably 60-4% by weight in the monomer mixture (A). When the content is more than 70% by weight, the abrasion resistance of the hardened film is inferior and when less than 2% by weight, the film has inferior flexibility and cracks occur in the hardened film when deforming strain is applied to the substrate to decrease adhesiveness to the substrate. This monomer may also be used alone or in admixture of two or more other monomers within the range mentioned above.

The polyfunctional momomers used in this invention are those which can be hardened in air and preferably are at least one polyfunctional (meth)acrylates which are represented by the following general formula:

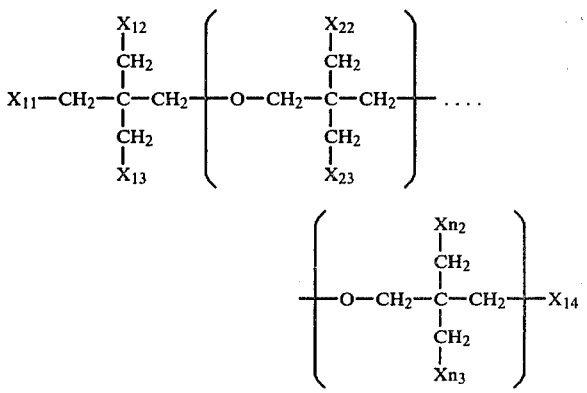

(wherein at least three of $X_{11}$, $X_{12}$, $X_{13}$, $X_{22}$, $X_{23}$, ... $X_{n2}$, $X_{n3}$ and $X_{14}$ are $CH_2=CR-COO-$ group and the remainder are $-OH$ group, n is an integer of 1-5 and R is hydrogen atom or methyl group), and which are selected from the group consisting of poly(meth)acrylates of polypentaerythritol which have at least three methacryloyloxy and/or acryloyloxy groups in one molecule.

Examples of polyfunctional monomers of tri or higher functional represented by the above general formula are pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acryltate, etc.

Polyfunctional monomers such as trimethylolpropane tri(meth)acrylate, trimethylolethane tri(meth)acrylate, pentaglycerol tri(meth)acrylate, although these are similar polyfunctional acrylate monomers, are inferior in air-hardenability with actinic radiation and so it is difficult to produce crosslink-hardened films excellent in abrasion resistance in an air atmosphere.

The monomers having not more than two (meth)acryloyloxy groups in one molecule, that is, contain 1 or 2 (meth)acryloyloxy groups, which are used in combination with said polyfunctional monomers are necessary to impart flexibility to the crosslink-hardened film, increase durability and further increase adhesiveness to the substrate without reducing abrasion resistance of the film and examples thereof are as follows:

That is, examples of monomers having two (meth)acryloyloxy groups in one molecule are ethylene glycol di(meth)acrylate, 1,3-propylene glycol di(meth)acrylate, 1,4-butanediol di(meth)acrylate, 1,6-hexanediol di(meth)-acrylate, diethylene glycol di(meth)acrylate, triethylene glycol di(meth)-acrylate, tetraethylene glycol di(meth)acrylate, neopentyl glycol di(meth)-acrylate, 2,2 bis-(4-acryloxyethoxyphenyl) propane, 2,2 bis-(4-methacrloxyphenyl) propane, 2,2 bis-(4-acryloxyethoxyphenyl) propane, 2,2 bis-(4-methacryloxyethoxyphenyl) propane, 2,2 bis-(4-acryloxydiethoxyphenyl) propane, 2,2 bis-(4-methacryloxydiethoxyphenyl) propane, 2,2 bis-(4-acryloxypropoxyphenyl) propane, 2,2 bis-(4-methacryloxypropoxyphenyl) propane, 2,2 bis-(4-acryloxy-(2-hydroxypropoxy)phenyl) propane, 2,2 bis-(4-methacryloxy-(2-hydroxypropoxy)phenyl) propane, 2,2 bis-(4-acryloxy-(2-hydroxypropoxyethoxy)phenyl) propane, 2,2 bis-(4-methacryloxy-(2-hydroxypropoxyethoxy)phenyl) propane, etc.

Examples of monofunctional monomers having one (meth)acryloyloxy groups in one molecule are methyl (meth)acrylate, ethyl (meth)acrylate, propyl (meth)acrylate, butyl (meth)acrylate, isobutyl (meth)acrylate, t-butyl (meth)acrylate, 2-ethylhexyl (meth)acrylate, lauryl (meth)acrylate, stearyl (meth)acrylate, cyclohexyl (meth)acrylate, methoxyethyl (meth)acrylate, ethoxyethyl (meth)acrylate, butoxyethyl (meth)acrylate, 2-hydroxyethyl (meth)acrylate, 2-hydroxypropyl (meth)acrylate, 2-hydroxy-3-chloropropyl (meth)acrylate, glycidyl (meth)acrylate, 2-chloroethyl (meth)acrylate, ethylcarbitol (meth)acrylate, tetrahydrofurfuryl (meth)acrylate, benzyl (meth)acrylate, 1,4-butylene glycol mono(meth)acrylate, etc.

Among the monomers having not more than two (meth)acryloyloxy groups in one molecule as enumerated above, the following monomers are especially preferred because even when these monomers are irradiated with actinic radiation in air, they are superior to other monomers in polymerization activity. That is, one group of these monomers represented by the general formula:

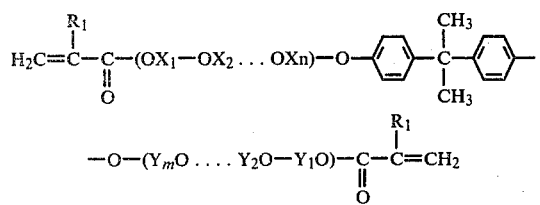

(wherein $R_1$ is hydrogen atom or methyl, $X_1, X_2 \ldots X_n$ and $Y_1, Y_2 \ldots Y_m$ are the same or different alkylene groups of not more than six carbon atoms or those in which one hydrogen atom is substituted with hydroxyl group, and n and m are integer of 0-5, and another group of these monomers have has a boiling point of 150° C. higher at normal pressure and a viscosity of not more than 20 centipoises at 20° C. and in which the group bonded to the (meth)acryloyloxy group has ether bond or hydroxyl group, e.g., methoxydiethylene glycol (meth)acrylate, ethoxyethyl (meth)acrylate, butoxyethyl (meth)acrylate, dipropylene glycol mono(meth)acrylate, glycidyl (meth)acrylate, tetrahydrofurfuryl (meth)acrylate, 2-hydroxyethyl (meth)acrylate, 2-hydroxypropyl (meth)acrylate, 1,4-butylene glycol mono(meth)acrylate, ethylcarbitol (meth)acrylate, diethylene glycol di(meth)acrylate, triethylene glycol di(meth)acrylate, tetraethylene di(meth)acrylate and dipropylene glycol di(meth)acrylate.

Therefore, the coating compositions which use the monomer mixtures of said preferred monomers and said polyfunctional monomers which have at least three (meth)acryloyloxy groups in one molecule and which are capable of polymerizing upon irradiation with actinic radiation in an air atmosphere have such good characteristics that not only are the compositions excellent in coating workability, uniform film forming ability and storage stability, but also they can form transparent crosslink-hardened films excellent in abrasion resistance, surface smoothness, flexibility, water resistance, heat resistance, solvent resistance, durability and adhesiveness to the substrate by irradiation with actinic radiation even in an air atmosphere.

The above are essential components of the monomer mixture (A) which is one component of the coating composition of the present invention. However, if necessary, at least one other vinyl monomer which is copolymerizable with said monomer mixture and has a polymerization activity upon irradiation by actinic radiation may be added in an amount of up to 50% by weight to impart antistatic properties, fog resistance and other functions to the crosslink-hardened film. Examples of these monomers are quaternary ammonium salts of (meth)acrylic esters, mono(meth)acrylic ester of polyethylene glycol, (meth)acrylic esters of phosphoric acid, dimethylaminoethyl methacrylate, etc.

The coating composition of this invention may be used in admixture with organic solvents having specific characteristics, if necessary. The organic solvents used in combination not only have good effects on coating operability at coating of the coating composition on the surface of the synthetic resin molded products, uniform film forming ability and storage stability, but also have an action of increasing adhesiveness of the crosslink-hardened film to the substrate. For example, they have a great effect on the adhesiveness of the hardened film to the substrate and durability of the film when synthetic resin molded products improved in their abrasion resistance of the surface by forming crosslink-hardened film are subjected to severe repeated tests comprising dipping in warm water→dipping in cold water→drying at high temperature. This is a surprising fact and reason for such effect is not clear. However, it is presumed that one of the reasons is a subtle interaction of the organic solvents on the substrate and the polyfunctional monomers, formation of uniform crosslink-hardened film very excellent in surface smoothness or synergistic action of them.

Conventionally, in the method for producing a crosslink-hardened film by coating polyfunctional (meth)acrylate monomers on the surface of the synthetic resin molded products and the like and irradiating the coating with actinic radiation causes a very rapid crosslink-hardening polymerization reaction, thus use of organic solvents with the polyfunctional (meth)acrylate monomers may result in some of the organic solvent remaining in the crosslink-hardened film to damage surface smoothness of the hardened film and so such method has been studied without the use of organic solvents. As the result of detailed research in an attempt to make good use of the merits in coating workability imparted by the use of organic solvents, it has been found that the organic solvents can be used only when they meet the following requirements and furthermore they have unexpected effects on the adhesiveness and durability of the crosslink-hardened film as mentioned above. That is, the organic solvents which can be used in admixture with the coating composition of this invention must meet the following two conditions.

1. They can form a homogeneous solution in admixture with the monomer mixture (A).
2. They have a boiling point of 50°–200° C. under normal pressure.

The first condition that they form a homogeneous solution in admixture with the monomer mixture (A) is the natural and the most important condition and, for example, the organic solvents of saturated hydro-carbons such as n-hexane, n-heptane, cyclohexane cannot be used because they do not produce homogeneous solution. The second condition that they have a boiling point of 50°–200° C. at normal pressure is the requirement necessary for forming crosslink-hardened film excellent in uniform film forming ability and surface smoothness when coated on the surface of synthetic resin molded products. When the boiling point under normal pressure is lower than 50° C., the surface of the substrate is cooled by the latent heat of the organic solvents volatilized from the film after coating the coating composition which condenses water in the air which damages surface smoothness of the film. When the boiling point is greater than 200° C., since volatilization of the organic solvents from the film is very slow there is the problem in workability and since volatilization of the remaining organic solvents at the time irradiation with actinic radiation to form the crosslink-hardened film by polymerization is not balanced, uniformity and surface smoothness of the crosslink-hardened film is lost or the organic solvents remain in the crosslink-hardened film which whitens the film.

Therefore, it is necessary that the organic solvents used have a boiling point of 50°–200° C., preferably 60°–150° C. under normal (i.e., atmospheric) pressure.

The amount of organic solvent mixed with the coating composition varies depending on the purpose of use, but is preferably within the range of 95–10 parts by weight per 5–90 parts by weight of the monomer mixture (A) (totally 100 parts by weight). When less than 10 parts by weight, the effect is small and when more than 95 parts by weight, controlling of thickness of the crosslink-hardened film becomes difficult or abrasion resistance becomes inferior.

The organic solvents which can be used here must meet said conditions and examples thereof are alcohols such as ethanol, isopropanol, normal propanol, isobutyl alcohol, normal butyl alcohol, etc., aromatic hydrocarbons such as benzene, toluene, xylene, ethylbenzene, etc., ketones such as acetone, methylethylketone, etc., ethers such as dioxane, etc., acid esters such as ethyl acetate, n-propyl acetate, n-butyl acetate, ethyl propionate, etc. These organic solvents may be used alone or as a mixed solvents of 2 or more if the boiling point and amount of the mixed solvent are within the ranges satisfying said requirements.

Furthermore, polymerizable monomers such as methyl acrylate, ethyl acrylate, methyl methacrylate, styrene, etc. may also be used as the organic solvent if a specific purpose is to be attained and they meet the same conditions as for the organic solvents and have the same effects.

Some of these organic solvents may fog the substrate which should be transparent, dissolve out dyes or pigments of colored substrate to cause discoloration or easily produce cracks in the substrate itself. Therefore, it is necessary to select the organic solvents depending upon the kind of substrate on which a crosslink-hardened film is formed and its use.

In order to form a crosslink-hardened film by coating the coating composition or the coating composition blended with organic solvents on the surface of synthetic resin molded products it is necessary to irradiate the coated composition with actinic radiation such as ultraviolet rays, electron ray, radiant ray, etc., among which irradiation with ultraviolet rays is practically the most preferred crosslink-hardening method. When ultraviolet rays are used as the actinic radiation for crosslink-hardening of the coating film, it is necessary to add a photosensitizer capable of initiating the polymerization reaction of said coating composition by irradiation with ultraviolet radiation. Specific examples of the photosensitizer are carbonyl compounds such as benzoin, benzoinmethyl ether, benzoinethyl ether, benzoinisobutyl ether, benzoinisopropyl ether, acetoin, butyrion, toluoin, benzil, benzophenone, p-chlorobenzophenone, p-methoxybenzophenone, etc., sulfur compounds such as tetramethylthiuram monosulfide, tetramethylthiruam disulfide, etc., azo compounds such as azobisisobutyronitrile, azobis-2,4-dimethylvaleronitrile, etc., peroxide compounds such as benzoyl peroxide, di-tertiary butyl peroxide, etc. These photosensitizer may be used alone or in admixture of 2 or more. The amount of the photosensitizers to the coating composition is 0–10 parts by weight, preferably 0.01–10 parts by weight per 100 parts by weight of the monomer mixture (A) or sum of the monomer mixture (A) and organic solvent (B). Addition in too much photosensitizer amount causes coloration of the crosslink-hardened film or reduction of weather resistance.

Furthermore, if necessary, additives such as antistatic agents, surfactants, storage stabilizers, etc. may be suitably added to the coating composition used in this invention.

The synthetic resin molded products used in this invention include various synthetic resin molded products regardless of thermoplastic or thermosetting resins and specific examples are sheet, film, rod and various injection molded products produced from polymethyl methacrylate resin, polycarbonate resin, polyallyldiglycol carbonate resin, polystyrene resin, acrylonitrile-styrene copolymer resin, polyvinyl chloride resin, acetate resin, ABS resin, polyester resin and the like.

Among these molded products, those produced from polymethyl methacrylate resin, polycarbonate resin, polyallyldiglycol carbonate resin and the like are often used because of their characteristics such as optical properties, heat resistance, shock resistance, etc. and furthermore demand for improving abrasion resistance is great, and so these molded products are especially preferred as those used in this invention.

The molded products used in this invention may be used as they are, but if necessary, they may be subjected to pretreatments such as washing, etching, corona discharging, irradiation with actinic radiation, dyeing, printing, etc.

As the methods for coating said coating composition on these synthetic resin molded products, brush coating, curtain coating, spray coating, rotating coating, dip coating, etc. are employed. Each of these methods has its merits and limitations and it is necessary to properly choose the coating method depending on the desired performance of the synthetic resin molded products and uses thereof. For example, when it is desired to impart abrasion resistance to only a part of the objective synthetic resin molded products, brush coating and curtain coating are suitable. When shape of the surface of the molded products is complicated, spray coating is suitable, when the molded products are relatively flat and symmetrical, rotating coating is suitable and when the molded products are in the form of rod or sheet, dip coating is suitable.

The amount of the coating material coated on the surface of the synthetic resin molded products varies depending on use of the molded products obtained or content of the monomers in the coating composition, but preferably it is coated so that the thickness of the crosslink-hardened film is formed on the surface of the synthetic resin molded products is within the range of 1-30μ. When the thickness is less than 1μ, abrasion resistance is inferior and when more than 30μ, flexibility of the film is damaged and cracks are liable to occur in the film whereby strength of the molded products themselves may be reduced.

As mentioned above, there are various methods for coating the coating composition, among which especially the dip coating method is simple and excellent in productivity and furthermore can relatively freely change the thickness of the crosslink-hardened film although it might be restricted somewhat depending on the shape of the synthetic resin molded products. However, in order that the dip coating method can be applied and the merit of this method can be utilized, the coating material is required to meet the following various conditions.

That is, it must satisfy such conditions that viscosity of the coating material can be relatively freely controlled, the coating material is excellent in film-forming property by dip coating, viscosity of the coating material does not change with lapse of time and the coating material is excellent in storage stability.

The coating compositions of this invention, especially those in which an organic solvent is incorporated meet said requirements and have a good adaptability to the dip coating method which can form a transparent crosslink-hardened film excellent in abrasion resistance, surface smoothness, flexibility, durability, water resistance, heat resistance, solvent resistance and adhesiveness to the substrate.

Furthermore, for some uses of the synthetic resin molded products on which the crosslink-hardened film is formed, very excellent surface smoothness is required and furthermore it is required to stand severe conditions, e.g., bending working under suitable heating, machining such as cutting or perforating, application of a great deformation strain at fitting of parts or during use. In such case, it is naturally necessary that the crosslink-hardened film per se is excellent in characteristics such as flexibility and adhesiveness to the substrate resin, and as the second factor the thickness of the hardened film is an important factor. That is, the thinner film has the higher durability against these external actions, but too thin film has lower abrasion resistance. Therefore, thickness of the crosslink-hardened film is desirably 1-9μ when it is to be subjected to severe conditions.

At the conventional technical level according to which the conventional polyfunctional (meth)acrylate monomers or mixtures thereof are used as crosslink-hardened film forming material, it has been impossible to form the thin crosslink-hardened film excellent in abrasion resistance, surface smoothness, uniformity of thickness, transparency and appearance on the surface of the synthetic resin molded products.

It has now become possible to form a thin transparent crosslink-hardened film of 1-9μ in thickness which is excellent in abrasion resistance, surface smoothness, uniformity of thickness, appearance and adhesiveness to the substrate by coating a coating composition of the present invention to which an organic solvent has been added and which is prepared so as to have a viscosity of 10 centipoise or less at 25° C. on the surface of synthetic resin molded products by the dip coating method and crosslink-hardening it. This is one of the important aspects of this invention.

Next, the coating composition coated by a suitable method depending upon the shape of the synthetic resin molded products or desired properties and is crosslink-hardened by irradiation with actinic radiation. When the coating composition to which an organic solvent is added is used as a coating material, preferably the synthetic resin molded products coated with said coating composition is placed under specific conditions to volatilize and release more than 50% by weight of the organic solvent contained in the film coated on the surface of the synthetic resin molded products and thereafter this is irradiated with actinic radiation. When the coated film containing more than 50% by weight of the organic solvent is irradiated with actinic radiation, there may occur undesired phenomena such as loss of surface smoothness of the formed crosslink-hardened film, generation of bubbles in the film, retention of the organic solvent in the crosslink-coated film which causes whitening of the film etc.

For formation of the crosslink-hardened film actinic radiation such as ultraviolet rays emitted from light sources, e.g., xenon lamp, low pressure mercury lamp, medium pressure mercury lamp, high pressure mercury lamp or ultra-high pressure mercury lamp and radiant rays, e.g., α rays, β rays, γ rays and electron rays ordinarily taken out from electron accelerator of 20-2000 kv must be irradiated on the coated film to crosslink-harden it.

From practical and working viewpoints, ultraviolet radiation is most preferred as the source for irradiation.

As the atmosphere in which actinic radiation is irradiated, inert atmospheres such as nitrogen gas, carbon dioxide gas, etc. or atmospheres having reduced oxygen concentration may, of course, be employed, but the coating composition of this invention can form a crosslink-hardened film excellent in characteristics such as abrasion resistance, etc. even in the usual air atmosphere. The temperature of the atmosphere may be warmed to such a degree as causing no deformation which is harmful for the substrate synthetic resin molded products.

The coating composition of this invention and the synthetic resin molded products having a crosslinked-hardened film produced using the coating composition are excellent in surface smoothness and appearance and excellent in surface hardness, abrasion resistance and mar resistance. Furthermore, the crosslink-hardened film formed on the surface is a transparent and uniform film having flexibility, is excellent in adhesiveness to the substrate and is not peeled off nor does not form cracks even under severe conditions. Thus, this is very useful for organic window glasses, covers for lighting fixtures, light reflectors, mirrors, lenses for eyeglasses, lenses for sunglasses, optical lenses, lenses for watches, etc.

This invention will be explained in more detail in the following Examples.

Measurements and evaluations in the Examples were conducted as follows:

1. Abrasion resistance

| 1. | Abrasion resistance | |
|---|---|---|
| (a) | Surface hardness | Pencil hardness in accordance JISK 5651 - 1966 |
| (b) | Mar test | Mar test by steel wool of #000. |
| | 0 | The surface is hardly marred by light rubbing |
| | Δ | The surface is slightly marred by light rubbing |
| | X | The surface is greatly marred by light rubbing (in the same degree as the substrate resin is marred.) |

2. Adhesiveness

Peeling test of crosscut adhesive cellophane tape on the crosslink-hardened film. That is, eleven cutting lines which reach the substrate are cut at an interval of 1 mm in vertical and horizontal directions of the film to produce 100 squares of 1 mm² and an adhesive cellophane tape is put thereon. Then, this tape is rapidly peeled off. This is repeated 3 times on the same portions.

| 0 | No squares are peeled off after repetition of 3 times. |
|---|---|
| Δ | 1-50 squares are peeled off after repetition of 3 times |
| X | 51-100 squares are peeled off after repetition of 3 times. |

3. Flexibility (Maximum bending angle)

A crosslink-hardened film is formed on the surface of a sheet-like molded product of 2-3 mm thick, from which a test piece strip of 6 mm in width and 5 cm in length is cut. Force is applied from both ends of this strip to give bending deforming strain thereto and the angle formed by the test piece to the horizontal plane when cracks are generated is measured. This is "maximum bending angle" and with increase of this angle, the flexibility of the film is greater.

4. Thermal cycle test

A molded product having a crosslink-hardened film on the surface is dipped in a warm water of 65° C. for 1 hour, immediately thereafter dipped in an ice water of 0° C. for 10 minutes and then hot-air dried at 80° C. for 1 hour. This is repeated several times and thereafter various tests are conducted.

5. Smoothness of surface

| 0 | Smoothness of the surface of the film is very good and is considered to be a specular surface. |
|---|---|
| Δ | Uniformity of the surface of the film is good, but there are slight irregularities and this surface cannot be considered to be a specular surface. |
| X | There are clear irregularities on the surface and the surface lacks smoothness. |

Having now fully described the invention, a more complete understanding can be obtained by reference to certain specific examples, which are included for purposes of illustration only and are not intended to be limiting unless otherwise specified.

EXAMPLE 1

The coating compositions as shown in Table 1 were prepared. They were coated on one surface of a methacrylic resin sheet of 2 mm thick (trade name: ACRYLITE manufactured by Mitsubishi Rayon Co., Ltd.) by a bar coater and irradiated with ultraviolet rays from a high pressure mercury arc lamp (H02-L21, 2 KW manufactured by Iwasaki Electric Co., Ltd.) at a distance of 15 cm from the surface for 15 seconds in the atmospheres as shown in Table 1. The results are shown in Table 1. As is clear from Table 1, the coating compositions of this invention exhibited good hardenability even in an air atmosphere.

On the other hand, the coating compositions other than those of this invention, e.g., experiment Nos. 5, 7 and 8 did not harden in an air atmosphere.

EXAMPLE 2

The coating compositions as shown in Table 2 were prepared. In these compositions were dipped methacrylic resin sheets (manufactured by Mitsubishi Rayon K.K.) and the sheets were taken up therefrom at a speed of 0.5 cm/sec to form a film thereon. These were left as they were for 10 minutes. Then, both surfaces of these sheets irradiated with ultraviolet rays from the same high pressure mercury arc lamp as used in Example 1 at a distance of 15 cm from each surface for 15 seconds in the atmospheres as shown in Table 2. The results obtained are shown in Table 2.

As is clear from Table 2, the coating compositions of this invention had good hardenability in an air atmosphere while the coating compositions other than those of this invention did not harden in an air atmosphere.

EXAMPLE 3

The coating compositions as shown in Table 3 were prepared and methacrylic resin cast sheets 3 mm thick were dipped therein. Then, these plates were slowly taken up therefrom at a speed of 0.5 cm/sec to form a coating film of said composition on the surface of the sheets. Both coated surfaces of these sheets were irradiated with ultraviolet rays from a 2 KW high pressure mercury arc lamp at the distance of 15 cm from each coated surface for 15 seconds in an air atmosphere to form a transparent crosslink-hardened film. The results obtained are shown in Table 3.

As is clear from the results, the sheets obtained in accordance with the method of this invention (experiment Nos. 1-3) had well balanced properties. On the other hand, when the ranges of the components in the monomer mixture were outside those of this invention, the obtained films were inferior in hardness, flexibility and adhesiveness to the substrate.

TABLE 1

| Experiment Number | Composition of the Coating Composition (part by weight) Monomer Mixture A | Photosensitizer | Hardening Atmosphere | Film Forming Ability of Coating Material | Thickness of Film ($\mu$) | Abrasion Resistance Pencil Hardness | Steel Wool Test |
|---|---|---|---|---|---|---|---|
| 1 (Example) | 2P5A * 80 THF-A 20 | Benzoin ethyl ether = 0.8 Benzophenone = 1.2 | Air | Good | 12 | 9H | 0 |
| 2 (Reference Example) | 2P5A * 80 THF-A 20 | Benzoin ethyl ether = 0.8 Benzophenone = 1.2 | $N_2$ | Good | 12 | 9H | 0 |
| 3 (Example) | 2P5A 80 2-EHA 20 | Benzoin ethyl ether = 0.8 Benzophenone = 1.2 | Air | Good | 12 | 8H | 0 |
| 4 (Reference Example) | 2P5A 80 2-EHA 20 | Benzoin ethyl ether = 0.8 Benzophenone = 1.2 | $N_2$ | Good | 12 | 8H | 0 |
| 5 (Comparative Example) | TMPTA 80 2-EHA 20 | Benzoin ethyl ether = 0.8 Benzophenone = 1.2 | Air | Good | Not Hardened | — | — |
| 6 (Comparative Example) | TMPTA 80 2-EHA 20 | Benzoin ethyl ether = 0.8 Benzophenone = 1.2 | $N_2$ | Good | 12 | 8H | 0 |
| 7 (Comparative Example) | TMETA 80 THF-A 20 | Benzoin ethyl ether = 0.8 Benzophenone = 1.2 | Air | Good | Not Hardened | — | — |
| 8 (Comparative Example) | TMETA 80 THF-A 20 | Benzoin ethyl ether = 0.8 Benzophenone = 1.2 | $N_2$ | Good | 12 | 8H | 0 |

2P5A = Dipentaerythritol pentaacrylate
THF-A = Tetrahydrofurfuryl acrylate
TMETA = Trimethylolethane triarylate
2-EHA = 2-Ethylhexyl acrylate
TMPTA = Trimethylolpropane triacrylate

TABLE 2

| Experiment Number | Compositions of the Coating Composition (part by weight) Monomer Mixture A | Organic Solvent (B) | Photosensitizer (C) | Hardening Atmosphere | Film Forming Ability of Coating Material | Smoothness of Hardened Film | Thickness of Film ($\mu$) | Abrasion Resistance Pencil Hardness | Steel Wool Test |
|---|---|---|---|---|---|---|---|---|---|
| 1 (Example) | 2P5A 32 THF-A 8 | Isopropanol 50 Toluene 10 | Benzoin ethyl ether = 0.8 Benzophenone = 1.2 | Air | Good | 0 | 4 | 8H | 0 |
| 2 (Reference Example) | 2P5A 32 THF-A 8 | Isopropanol 50 Toluene 10 | Benzoin ethyl ether = 0.8 Benzophenone = 1.2 | $N_2$ | Good | 0 | 4 | 8H | 0 |
| 3 (Example) | 2P5A 32 2-EHA 8 | Isopropanol 50 Toluene 10 | Benzoin ethyl ether = 0.8 Benzophenone = 1.2 | Air | Good | 0 | 3 | 7H | 0 |
| 4 (Reference Example) | 2P5A 32 2-EHA 8 | Isopropanol 50 Toluene 10 | Benzoin ethyl ether = 0.8 Benzophenone = 1.2 | $N_2$ | Good | 0 | 3 | 7H | 0 |
| 5 (Comparative Example) | TMPTA 32 2-EHA 8 | Isopropanol 50 Toluene 10 | Benzoin ethyl ether = 0.8 Benzophenone = 1.2 | Air | Good | Not Hardened | — | — | — |
| 6 (Comparative Example) | TMPTA 32 2-EHA 8 | Isopropanol 50 Toluene 10 | Benzoin ethyl ether = 0.8 Benzophenone = 1.2 | $N_2$ | Good | 0 | 2.5 | 7H | 0 |
| 7 (Comparative Example) | TMETA 32 THF-A 8 | Isopropanol 50 Toluene 10 | Benzoin ethyl ether = 0.8 Benzophenone = 1.2 | Air | Good | Not Hardened | — | — | — |
| 8 (Comparative | TMETA 32 THF-A 8 | Isopropanol 50 Toluene 10 | Benzoin ethyl ether = 0.8 Benzophenone | $N_2$ | Good | 0 | 2.5 | 7H | 0 |

TABLE 2-continued

| Experiment Number | Compositions of the Coating Composition (part by weight) | | | Hardening Atmosphere | Film Forming Ability of Coating Material | Smoothness of Hardened Film | Thickness of Film (μ) | Abrasion Resistance | |
|---|---|---|---|---|---|---|---|---|---|
| | Monomer Mixture A | Organic Solvent (B) | Photosensitizer (C) | | | | | Pencil Hardness | Steel Wool Test |
| Example) | | | = 1.2 | | | | | | |

TABLE 3

| Experiment Number | Coating Composition (parts by weight) | | Film forming Ability of Coating Material | Property of Crosslinked Hardened Film | | Abrasion Resistance Of Molded Product | | Adhesiveness of Hardened Film | Flexibility of Molded Product (Maximum bending angle) | After Five Thermal Cycles | |
|---|---|---|---|---|---|---|---|---|---|---|---|
| | Monomer Mixture (A) | Organic Solvent (B) | | Thickness (μ) | Smoothness Uniformity | Pencil hardness | Steel Wool Test | | | Pencil Hardness | T.K.P. Adhesiveness of Film |
| 1 (Example) | 5E4A* 12 5E3A 12 EPP2A 6 BIPE 2 | Isopropyl Alcohol 60 Toluene 10 | Good | 5 | Good | 7H | 0 | 0 | 21°–23° | 7H | 0 |
| 2 (Example) | 2P5A 24 5E3A 4 C4-DA 1 BIPE 2 | Isopropyl Alcohol 60 Toluene 10 | Good | 5 | Good | 8H | 0 | 0 | 16°–18° | 8H | 0 |
| 3 (Example) | 2P5A 25 THFA 5 BIPE 2 | Isopropyl Alcohol 60 Toluene 10 | Good | 5 | Good | 7H | 0 | 0 | 23°–25° | 7H | 0 |
| 4 (Comparative Example) | 5E4A 2 TMPTA 25 C4-DA 3 BIPE 2 | Isopropyl Alcohol 60 Toluene 10 | Good | Hardening was insufficient | | — | — | — | — | — | — |
| 5 (Comparative Example) | 5E4A 15 5E3A 15 BIPE 2 | Isopropyl Alcohol 60 Toluene 10 | Good | 6 | Good | 8H | 0 | X | 10°–12° | 8H | X |
| 6 (Comparative Example) | 5E4A 2 6E3A 2 EPP2A 26 BIPE 2 | Isopropyl Alcohol 60 Toluene 10 | Good | 4 | Good | 7H | X | 0 | 28°–30° | 1H | 0 |

*5E4A = Pentaerythritol tetraacrylate
5E3A = Pentaerythritol triacrylate
2P5A = Dipentaerythritol pentaacrylate
BIPE = Benzoinisoproply ether
TMPTA = Trimethylolpropane triacrylate
EPP2A = 2,2-bis(4-acryloxy diethoxyphenyl) propane
C4-DA = 1,4-butanediol diacrylate
THF-A = Tetrahydrofurfuryl acrylate

EXAMPLE 4

A coating composition comprising 25 parts by weight of dipentaerythritol pentaacrylate, 25 parts by weight of pentaerythritol triacrylate, 50 parts by weight 2,2 bis-(4-acryloxyethoxyphenyl) propane and 2 parts by weight of benzoinisobutyl ether was coated on the surface of a plastic artificial tooth produced by molding a dental methacrylic resin by a brush so that thickness of the film was 14–16μ.

This was fixed to the rotating axis in the quartz tube fitted with a rotation driving body, then said rotating axis was rotated at a rate of 5 rpm and while passing air through the tube a far infared ray of 300 W was irradiated for 2 minutes and subsequently a high pressure mercury lamp of 100 W was irradiated for 10 minutes obliquely and from above outside the quartz tube to form a crosslink-hardened film on the surface of the plastic artificial tooth. Thus obtained molded product was excellent in the result of steel wool mar test and adhesiveness of the hardened film.

EXAMPLE 5

360 parts by weight of dipentaerythritol pentaacrylate, 40 parts by weight of 2,2 bis-(4-acryloxydiethoxyphenyl) propane and 20 parts by weight of benzoinethyl ether were mixed with agitation at 60° C. to obtain a monomer mixture. This monomer mixture was mixed with an organic solvent comprising 340 parts by weight of isopropyl alcohol and 60 parts by weight of xylene at ratios as shown in Table 4 to obtain homogeneous coating compositions.

A methacrylic resin cast molded plate 3 mm thick was dipped in each of these coating compositions and was slowly taken out at a rate of 0.5 cm/sec to form a coated film of said coating composition on the surface of the molded plates.

This was left to stand at room temperature of 25° C. for 30 minutes and thereafter was fitted to a driven body which can be transferred into a high output power opposing ultraviolet rays irradiating box in which two high pressure mercury lamps of 2 KW were opposed and air was passed. Then, the driven body was set so that the time of irradiation of ultraviolet rays was 15 seconds and the driven body was passed through the irradiating box to form a crosslink-hardened film on the surface of the molded plate. Properties of thus obtained molded products are shown in Table 4.

As is clear from the above results, when the dip coating method was employed, the thickness of crosslink-hardened film could relatively easily be controlled by adjusting viscosity of the coating composition and surface smoothness and uniformity of the film were excellent.

rays irradiating apparatus as used in Example 5 for 15 seconds to form a crosslink-hardened film on the surface of the molded product.

Various properties of the obtained molded products were measured and the results are shown in Table 5.

As is clear from the results of Table 5, when organic solvents other than those of this invention are used, formation of coated film, adhesiveness of hardened film and appearance of the hardened film are inferior.

TABLE 4

| Experiment Number | Coating Composition (part by weight) Monomer Mixture (A) | Coating Composition (part by weight) Organic Solvent (B) | Coating Viscosity of coating Composition Centipoise/25° C. | State of Crosslink-Hardened Film Thickness (μ) | State of Crosslink-Hardened Film Smoothness | Abrasion Resistance of the Molded Products Pencil Hardness | Abrasion Resistance of the Molded Products Steel Wool Mar Test | Adhesiveness of the Hardened Film | Flexibility of the Molded the Molded Products bending angle) | After Five Thermal Cycle Tests Pencil Hardness | After Five Thermal Cycle Tests Adhesiveness |
|---|---|---|---|---|---|---|---|---|---|---|---|
| 1 (Example) | 10 | 90 | 4.1 | 3.5 | Good | 7H | 0 | 0 | 36~38° | 7H | 0 |
| 2 (Example) | 20 | 80 | 4.4 | 3.9 | Good 8H | 0 | 0 | 33~35° | 8H | 0 | |
| 3 (Example) | 30 | 70 | 4.8 | 4.5 | Good | 8H | 0 | 0 | 30~32° | 8H | 0 |
| 4 (Example) | 40 | 60 | 5.6 | 5.5 | Good | 8H | 0 | 0 | 26~28° | 8H | 0 |
| 5 (Example) | 50 | 50 | 6.4 | 6.3 | Good | 8H | 0 | 0 | 23~25° | 8H | 0 |
| 6 (Example) | 60 | 40 | 8.5 | 8.0 | Good | 8H | 0 | 0 | 19~21° | 8H | 0 |
| 7 | 70 | 30 | 12.0 | 10~11 | Good | 8H | 0 | 0 | 12~13° | 8H | 0 |
| 8 (Example) | 80 | 20 | 16.0 | 15~16 | Good | 8H | 0 | 0 | 9~10° | 8H | 0 |
| 9 (Comparative Example | 2 | 98 | 2.0 | 0.5 | Good | 3H | Δ | 0 | greater than | 3H | 0 |

EXAMPLE 6

40 parts by weight of dipentaerythritol pentaacrylate, 40 parts by weight of pentaerythritol tetraacrylate, 12 parts by weight of pentaerythritol triacrylate, 8 parts by weight of 2,2 bis-(4-acryloxypropoxyphenyl) propane, 4 parts by weight of benzoinethyl ether and 300 parts by weight of the organic solvents shown in Table 5 were mixed to obtain homogeneous coating compositions. A methacrylic resin cast molded plate of 2 mm thick was dipped in each of these compositions and then was slowly withdrawn therefrom to form coated film on the surface of the molded plate. This was left to stand for 10 minutes in a box in which a warm air of 40° C. was passed and then was irradiated with ultraviolet ray using the same high output power opposing ultraviolet

EXAMPLE 7

10 parts by weight of dipentaerythritol hexaacrylate, 20 parts by weight of dipentaerylthritol pentaacrylate, 10 parts by weight of pentaerythritol tetramethacrylate, 10 parts by weight of 2,2 bis-(4-methacryloxyethoxyphenyl) propane, 40 parts by weight of isopropyl alcohol and 10 parts by weight of toluene were mixed to produce a homogeneous solution. A sensitizer mixture of 0.4 part by weight of benzoinisobutyl ether, 0.4 part by weight of benzoinethyl ether and 1.2 parts by weight of benzophenone as a photosensitizer was dissolved in said solution to obtain a coating composition. This was spray coated on the outer surface of a commercial methacrylic resin injection molded product of 3 mm in thickness, 6 cm in diameter and 5 cm in height.

TABLE 5

| Experiment Number | Kind and Boiling Points of the Organic Solvent Used Kind | Kind and Boiling Points of the Organic Solvent Used Boiling Points (°C.) | State of the Coated Film | Property of the Crosslink-Hardened Film | (μ) Thickness of the Hardened Film | Abrasion Resistance of Surface Pencil hardness | Abrasion Resistance of Surface Steel Wool Mar Test | Adhesiveness of Hardened Film |
|---|---|---|---|---|---|---|---|---|
| 1 (Example) | Mixed solvent of ethanol/toluene = 80/20% by weight | 78.3* | Good | Surface smoothness was excellent and thickness of the film was uniform and the film was transparent | 4.4 | 8H | 0 | 0 |
| 2 (Example) | Mixed solvent of n-propyl alcohol/toluene = 80/20% by weight | 97.2* | Good | Surface smoothness was excellent and thickness of the film was uniform and the film was transparent | 4.6 | 8H | 0 | 0 |
| 3 | Mixed solvent of isopropyl | 82.3* | Good | Surface smoothness was | 4.6 | 8H | 0 | 0 |

TABLE 5-continued

| Experiment Number | Kind and Boiling Points of the Organic Solvent Used | | State of the Coated Film | Property of the Crosslink-Hardened Film | (μ) Thickness of the Hardened Film | Abrasion Resistance of Surface | | Adhesiveness of Hardened Film |
|---|---|---|---|---|---|---|---|---|
| | Kind | Boiling Points (°C.) | | | | Pencil hardness | Steel Wool Mar Test | |
| (Example) 4 | alcohol/toluene = 80/20% by weight Toluene | 110.6 | Good | excellent and thickness of the film was uniform and the film was transparent Surface smoothness was excellent and thickness of the film was uniform and the film was transparent | 5.2 | 7H | 0 | 0 |
| (Example) 5 | Xylene | 138.4 | Good | Surface smoothness was excellent and thickness of the film was uniform and the film was transparent | 5.2 | 7H | 0 | 0 |
| (Example) 6 | Ethylbenzene | 136.2 | Good | Surface smoothness was excellent and thickness of the film was uniform and the film was transparent | 4.8 | 7H | 0 | 0 |
| (Example) 7 | Dioxane | 101.3 | Good | Surface smoothness was excellent and thickness of the film was uniform and the film was transparent | 4.4 | 8H | 0 | 0 |
| (Example) 8 | Ethyl propionate | 99.1 | Good | Surface smoothness was exellent and thickness of the film was uniform and the film was transparent | 4.5 | 8H | 0 | 0 |
| (Example) 9 (Comparative Example) | Ethyl ether | 34.6 | Fine water droplets adhered and the film was opaque | Wave-like pattern was seen on the surface and appearance was not good | 4.4 | 8H | 0 | Δ |
| 10 (Comparative Example) | Butyl benzoate | 250.3 | Good | The surface film was milk-white and appearance was not good | 7~8 | 7H | Δ~0 | Δ~X |

*Boiling point of alcohol which is main solvent.

This was left to stand at room temperature of 25° C. for 30 minutes. Then, this was exposed to a light source from a high pressure mercury lamp of 2 KW at a distance of about 30 cm from the coated surface for 20 seconds in an air atmosphere to form a crosslink-hardened film of 11μ in an average thickness on the outer surface of said molded product.

Abrasion resistance of the outer surface of thus obtained molded product was 8 H in pencil hardness and this was also excellent in steel wool mar test. Furthermore, adhesiveness of the hardened film was such that no peeling occurred at crosscut adhesive cellophane tape test and no change was seen even after five thermal cycle tests.

EXAMPLE 8

In a coating composition comprising 20 parts by weight of dipentaerythritol pentaacrylate, 10 parts by weight of 2,2 bis-(4-acryloxyethoxyphenyl) propane, 10 parts by weight of 2,2 bis-4-(2 hydroxy-3-acryloxypropoxy phenyl)propane, 55 parts by weight of n-butyl alcohol, 15 parts by weight of toluene and 1.5 parts by weight of benzoinisobutyl ether was dipped a polycarbonate plate-like molded product of 2 mm thick to form a coated film.

This was irradiated with light from a high pressure mercury lamp in the same manner as in Example 5 to form a crosslink-hardened film on the surface of the molded product. The surface of thus obtained molded product was very excellent in smoothness and thickness of the hardened film was 5.0μ. Pencil hardness of the surface was 6 H, adhesiveness of the film was such that no peeling occurred at the crosscut adhesive cellophane tape test and both the abrasion resistance and adhesiveness of the film did not change even after five thermal cycle tests.

EXAMPLE 9

In a coating composition comprising 10 parts by weight of dipentaerythritol tetraacrylate, 10 parts by weight of dipentaerylthritol triacrylate, 4 parts by weight of 2,2 bis-(4-acryloxyethoxyphenyl) propane, 1 part by weight of 2,2 bis-(4-acryloxyphenyl) propane, 55 parts by weight of n-butyl alcohol, 15 parts by weight of xylene and 1.5 parts by weight of benzoinisobutyl ether was dipped a polyallyldiglycol carbonate lense (a lense manufactured by CR-39) and then was slowly withdrawn to form a coating film on the surface of said lense.

This was put in a quartz tube through which a hot air of 40° C. was passed and kept therein for 3 minutes. Thereafter, both surfaces of this lense kept at this state were irradiated with light of a high pressure mercury lamp of 100 W at a distance of 20 cm from the surface of the molded product for 10 minutes. In this case, for the first 2 minutes, far infared rays were irradiated on both surfaces of the lense obliquely and from above outside the quartz tube together with ultraviolet ray. The surface of thus obtained molded product was very excellent in smoothness and thickness of the hardened film was 5.2μ. Furthermore, pencil hardness of the surface was 8 H, the surface was excellent in the steel wool mar test and adhesiveness of the hardened film was such that no peeling occurred in the crosscut cellophane adhesive tape test.

EXAMPLE 10

12 parts by weight of pentaerythritol tetraacrylate, 13 parts by weight of pentaerythritol triacrylate, 13 parts by weight of 2,2 bis-(4-acryloxydiethoxyphenyl) propane, 2 parts by weight of 1,4-butanediol diacrylate, 2 parts by weight of benzoinisobutyl ether, 50 parts by weight of isopropyl alcohol and 15 parts by weight of toluene were mixed to prepare a homogeneous coating material.

A methacrylic resin molded product was produced having a crosslink-hardened film of 5.2μ thick in the same manner as in Example 5.

This molded product had a very excellent surface smoothness and had a pencil hardness of 7 H. No peeling of the film occurred at crosscut adhesive cellophane tape test and adhesiveness of the film was good.

EXAMPLE 11

5 parts by weight of dipentaacrythritol pentacrylate, 10 parts by weight of pentaerythritol tetraacrylate, 10 parts by weight of pentaerythritol triacrylate, 5 parts by weight of 2,2 bis-(4-methacryloxypropoxyphenyl) propane, 2 parts by weight of benzoinisobutyl ether and 70 parts by weight of a mixed solvent comprising methyl methacrylate/isopropyl alcohol/toluene=40/40/20% by weight were mixed to obtain a homogeneous coating composition. A methacrylic resin cast molded plate of 4 mm thick was dipped in said coating composition and was slowly withdrawn therefrom to obtain a coating film on the surface of the molded product.

This was subjected to the hardening treatment in the same manner as in Example 5 to obtain a molded product having a crosslink-hardened film of 5.5μ thick.

Surface appearance of said molded product was very good. This product had a pencil hardness of 8 H and was excellent in both steel wool mar test and adhesiveness of the film. No changes occurred in abrasion resistance and adhesiveness.

EXAMPLE 12

32 parts of dipentaerythritol pentaacrylate, 8 parts of 2-hydroxypropyl acrylate, 60 parts of isopropyl alcohol and 2 parts of benzoinisopropyl ether were mixed to obtain a homogeneous coating composition.

A polycarbonate sheet of 3 mm thick was dipped in said coating composition and taken up therefrom at a speed of 0.6 cm/sec to form a film thereon. Both surfaces of this sheet were irradiated with ultraviolet rays from a 2 KW high pressure mercury arc lamp at a distance of 15 cm from each surface for 11 seconds in an air atmosphere. As the result, the film was completely hardened and this hardened film was transparent film having a good surface smoothness.

The thickness of the film was 4μ and the surface hardness of 6 H in pencil hardness. Adhesiveness of the film to the substrate was such that no peeling of the film was caused after the crosscut cellophane tape test was repeated three times on the same portion. Moreover, no change was seen after the thermal cycle test was effected five times.

EXAMPLE 13

A coating composition comprising 30 parts of dipentaerythritol pentaacrylate, 10 parts of tetrahydrofurfuryl acrylate, 60 parts of isopropyl alcohol, 10 parts of toluene and 2 parts of benzoinisobutyl ether was prepared.

A polymethyl methacrylate sheet of 2 mm thick was dipped in said composition and was taken therefrom at a speed of 0.45 cm/sec to form a film. Both surfaces of said sheet were irradiated with ultraviolet rays from a 2 KW high pressure mercury arc lamp at a distance of 15 cm from each surface for 11 seconds in an air atmosphere. As the result, the coating film was completely hardened to obtain a transparent film having a good surface smoothness.

The thickness of the film was 3μ, the surface hardness was 8 H in pencil hardness and the adhesiveness to the substrate was such that no peeling of the film was caused by crosscut cellophane tape test.

EXAMPLE 14

A coating composition comprising 20 parts of dipentaerythritol pentaacrylate, 8 parts of dipentaerythritol tetraacrylate, 6 parts of 2,2 bis-(4-acryloxydiethoxyphenyl) propane, 6 parts of 2-hydroxyethyl acrylate, 60 parts of isopropyl alcohol, 20 parts of toluene and 3 parts of benzoinisopropyl ether was prepared. A polymethyl methacrylate sheet of 3 mm thick was dipped in said composition and taken up therefrom at a speed of 0.45 cm/sec to form a film thereon. Both surfaces of this sheet were irradiated with ultraviolet rays from a 2 KW high pressure mercury arc lamp at a distance of 15 cm from each surface for 10 seconds in an air atmosphere. As the result, the film was completely hardened to obtain a transparent film having a good surface smoothness.

The thickness of the film was 4μ, the surface hardness was 7 H in pencil hardness and the adhesiveness to the substrate was such that no peeling of the film was caused by crosscut cellophane tape test. Moreover, no change was seen after thermal cycle.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A coating composition which comprises 100 parts by weight of a monomer mixture (A) comprising 30 to 98% by weight of at least one polyfunctional monomer having at least three groups selected from acryloyloxy group and methacryloyloxy group in one molecule and 70 to 2% by weight of tetrahydrofurfuryl methacrylate, tetrahydrofurfuryl acrylate, ethyl carbitol acrylate, or ethyl carbitol methacrylate, and 0 to 10 parts by weight of a photosensitizer wherein said composition can form a cross-link-hardened film which is excellent in abrasion resistance, upon irradiation with actinic radiation in an air atmosphere, wherein said polyfunctional monomer is polyfunctional (meth)acrylate selected from the group consisting of poly (meth)acrylates of mono or polypentaerythritol having at least three methacryloyloxy groups and/or acryloyloxy groups in one molecule wherein said mono or polypentaerythritol has the formula:

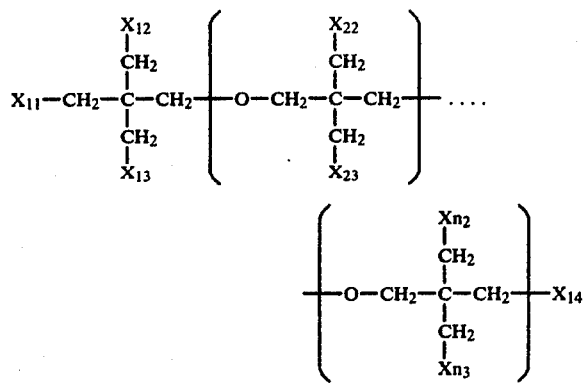

(wherein at least three of $X_{11}$, $X_{12}$, $X_{13}$, $X_{22}$, $X_{23}$ ... $X_{n2}$, $X_{n3}$ and $X_{14}$ are $CH_2=CR-COO-$ group and the remainder are $-OH$ group, n is an integer of 1-5 and R is hydrogen atom or methyl group), wherein said tetrahydrofurfuryl (meth)acrylate or ethyl carbitol (meth)acrylate has a boiling point of at least 150° C. at normal pressure and a viscosity of not more than 20 centipoises at 20° C.

2. The composition of claim 1, wherein said composition contains an organic solvent.

3. The coating composition of claim 1, wherein the polyfunctional monomer is selected from the group consisting of pentaerythritol tri and tetra(meth)acrylate.

4. The coating composition of claim 1, wherein the polyfunctional monomer is selected from the group consisting of dipentaerythritol tri, tetra, penta and hexa(meth)acrylate.

5. The coating composition of claim 2, wherein the polyfunctional monomer is selected from the group consisting of pentaerythritol tri and tetra(meth)acrylate.

6. The coating composition of claim 2, wherein the polyfunctional monomer is selected from the group consisting of dipentaerythritol tri, tetra, penta and hexa(meth)acrylate.

7. The coating composition of claim 2, wherein the organic solvent has a boiling point of 50°-200° C.

8. The coating composition of claim 2, which has a viscosity of not more than 10 centripoises at 25° C.

* * * * *